Feb. 28, 1950 — S. J. WITTMAN — 2,498,976

AIRPLANE LANDING GEAR

Filed June 17, 1948

INVENTOR
SYLVESTER J. WITTMAN

BY
ATTORNEYS

Patented Feb. 28, 1950

2,498,976

UNITED STATES PATENT OFFICE 2,498,976

AIRPLANE LANDING GEAR

Sylvester J. Wittman, Oshkosh, Wis.

Application June 17, 1948, Serial No. 33,551

2 Claims. (Cl. 244—104)

My invention refers to landing gear for airplanes and it has for its primary object to provide a universally flexible wheel carrying strut rods to absorb landing shocks, either in a vertical or horizontal direction, that would otherwise tend to damage the fuselage or body, under rough ground or emergency landing conditions, whereby such damage may be eliminated and service or maintenance is reduced to a minimum.

The specific object of my invention is to provide a universally yieldable or resilient pair of strut rods, flared from the body, the same being circular in cross section and gradually tapered from their point of anchorage to the wheel axle ends, whereby said rods are rendered yieldable in all directions.

A further object of my invention is to provide a pair of frame supported downwardly diverging anchor sleeves for the strut rods, the same being properly secured to the fuselage.

A further important object of my invention is to provide the sleeve supported rods with a gradual taper from a point intermediate their ends toward their opposite ends, so that flexing of the rods will result under shock in any direction.

Briefly, my invention is an advance in the art over the landing gear patented by me, the patent bearing Number 2,163,653, dated June 27, 1939, which structure provided resiliency in a vertical direction, under shock strain, while my present improvement is directed to absorbing shock from landing and travel over the field in all directions.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings.

Referring to the drawing in detail, wherein similar reference characters designate corresponding parts throughout the several views, the letter A generally indicates an airplane equipped with my improved landing gear G.

The airplane A itself forms no direct part of the invention and has merely been illustrated to show the use of my improved landing gear G. The airplane A includes the fuselage 5, which in the present instance can be considered as being made from light metal.

Figure 1:
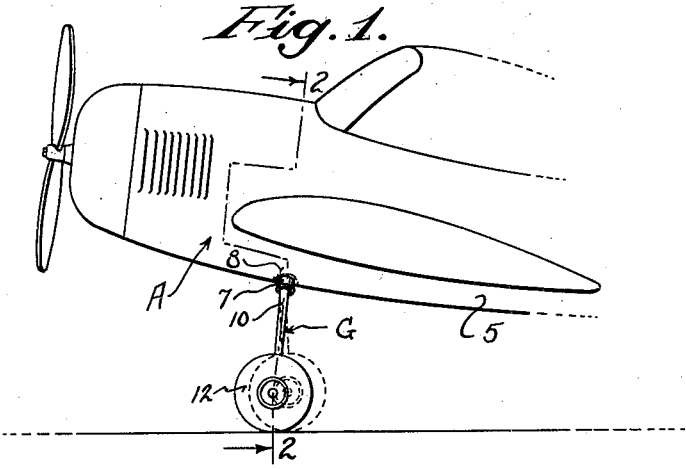
Figure 1 is a fragmentary, side elevational view of an airplane, illustrating my improved landing gear incorporated therewith, the gear being shown in full lines in its normal position and in dotted lines in a flexing rearward position.
Figure 2:
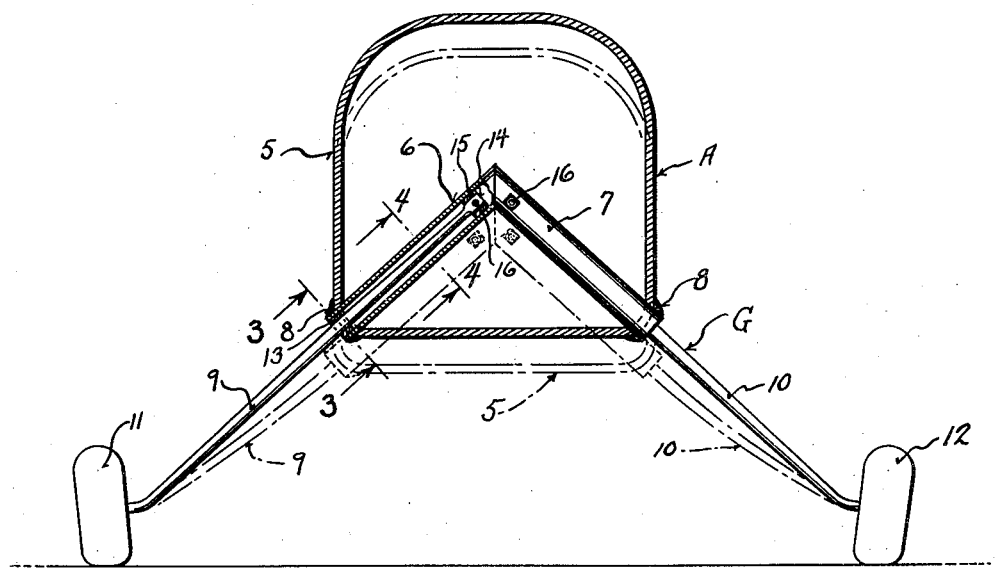
Figure 2 is a transverse, cross sectional view through the airplane equipped with my landing gear, the section being taken substantially on the line 2—2 of Figure 1, looking in the direction of the arrows, the dotted line showing of the gear, illustrating the flexing thereof under landing conditions, the view being on a greater scale than Figure 1.
Figures 3, 4:
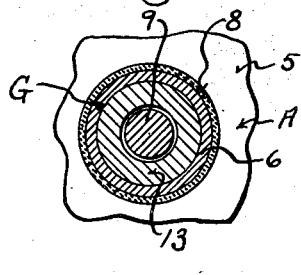
Figure 3 is an enlarged, fragmentary, detail sectional view taken on the line 3—3 of Figure 2, looking in the direction of the arrows.
Figure 4 is an enlarged, detail sectional view taken on the line 4—4 of Figure 3, looking in the direction of the arrows.

In accordance with my invention, the fuselage has rigidly secured thereto a pair of supporting sleeves 6 and 7. These sleeves meet at their upper ends and can be welded or otherwise secured together to form a rugged, rigid structure. These sleeves extend downwardly and outwardly and through the fuselage, as is clearly shown in Figure 2 of the drawing. These sleeves can be rigidly secured in place in any desired way, and as illustrated the outer ends thereof are welded as at 8, to the fuselage.

Mounted in the sleeves 6 and 7, is a pair of yieldable, resilient struts 9 and 10. These struts diverge downwardly and outwardly and their outer ends are provided with suitable axles on which are rotatably mounted the ground wheels 11 and 12.

The outer ends of the sleeves 6 and 7 can have welded or otherwise secured thereto, bearing collars 13, and the struts 9 and 10 extend through the collars and into the sleeves. The struts can be of a slightly less diameter than the internal diameter of the collars 13. The extreme inner ends of the struts can be provided with heads 14 and these heads can be received in bearing collars 15. Bolts 16 can be utilized for securing the heads 14 and the collars 15 to the sleeves.

Particular attention is directed to the struts 9 and 10. As brought out, these struts are formed from resilient material and the struts are of a circular shape in cross section, so that the struts can flex under strain in any direction. It is to be noted that the struts gradually taper from their points of engagement with the collars 13, toward the wheel spindles. Likewise, the struts also gradually taper from the collars 13 toward the heads 14.

From the foregoing description, it is apparent that upon landing of an airplane, the wheel carrying strut rods will yield both in a vertical and horizontal direction, with reference to the fuselage, whereby shocks incident to landing, and travel over rough ground, are eliminated, which would otherwise tend to seriously damage the fuselage, such conditions being frequent in standard landing gears which has been determined from years of flying experience by applicant.

Briefly, the salient features of my invention are to provide a landing gear, so designed that the airplane on which it is installed will be less subject to damage and safer for its occupants; as the landing gear struts will flex in any direction or after subjected to strain above their normal load factor or strength, they will bend or take a permanent set instead of breaking, as the conventional landing gear would do with consequent damage to airplane and its occupants.

I claim:

1. In an airplane, a pair of downwardly diverging sleeves secured to the airplane, and a pair of diverging resilient struts mounted in the sleeves, said struts being circular in cross section and extending outwardly beyond the sides of the airplane, wheel carrying spindles on the outer ends of said struts, and said struts being gradually tapered from their points of engagement with the sleeves to the wheel carrying spindles.

2. In an airplane, a landing gear therefor comprising a pair of downwardly diverging sleeves secured to the airplane, and a pair of diverging resilient struts having their upper ends received in the sleeves, the struts being of a circular shape in cross section and gradually tapered from the outer ends of the sleeves to their outer ends, means securing the inner ends of the struts to the inner ends of the sleeves, said struts also engaging the outer ends of the sleeves and gradually tapered from their points of engagement with the outer ends of the sleeves to their inner ends, whereby universal flexibility of said struts in all directions is obtained.

SYLVESTER J. WITTMAN.

REFERENCES CITED

The following references are of record in the file of this patent:

UNITED STATES PATENTS

| Number | Name | Date |
| --- | --- | --- |
| 2,031,419 | Kramer | Feb. 18, 1936 |
| 2,163,653 | Wittman | June 27, 1939 |

FOREIGN PATENTS

| Number | Country | Date |
| --- | --- | --- |
| 442,420 | France | June 20, 1912 |